(12) United States Patent
Jingoi et al.

(10) Patent No.: US 11,681,545 B2
(45) Date of Patent: Jun. 20, 2023

(54) REDUCING COMPLEXITY OF WORKFLOW GRAPHS THROUGH VERTEX GROUPING AND CONTRACTION

(71) Applicant: Cisco Technology, Inc., San Jose, CA (US)

(72) Inventors: Silviu Marian Jingoi, Ottawa (CA); Ali Mehregani, Thornhill (CA); Samer Salam, Beirut (LB)

(73) Assignee: Cisco Technology, Inc., San Jose, CA (US)

( * ) Notice: Subject to any disclaimer, the term of this patent is extended or adjusted under 35 U.S.C. 154(b) by 425 days.

(21) Appl. No.: 16/815,980

(22) Filed: Mar. 11, 2020

(65) Prior Publication Data
US 2021/0286644 A1 Sep. 16, 2021

(51) Int. Cl.
*G06F 16/22* (2019.01)
*G06F 16/28* (2019.01)
*G06F 9/48* (2006.01)

(52) U.S. Cl.
CPC ........ *G06F 9/4843* (2013.01); *G06F 16/2246* (2019.01); *G06F 16/287* (2019.01)

(58) Field of Classification Search
None
See application file for complete search history.

(56) References Cited

U.S. PATENT DOCUMENTS

| 7,877,737 | B2 | 1/2011 | Austin et al. |
| 8,903,824 | B2 | 12/2014 | Akoglu et al. |
| 10,025,879 | B2 | 7/2018 | Karras et al. |
| 2004/0078258 | A1* | 4/2004 | Schulz ................ G06Q 10/06 717/104 |
| 2007/0055558 | A1 | 3/2007 | Shanahan et al. |
| 2012/0030094 | A1* | 2/2012 | Khalil ................ G06Q 10/06 705/39 |
| 2015/0006231 | A1* | 1/2015 | Jandhyala ........ G06Q 10/06316 705/7.26 |
| 2017/0270146 | A1 | 9/2017 | Harrison et al. |
| 2018/0176096 | A1* | 6/2018 | Prabakaran ........ H04L 41/145 |
| 2021/0216356 | A1* | 7/2021 | Arnaudov ................ G06F 9/46 |

* cited by examiner

*Primary Examiner* — Dawaune A Conyers
(74) *Attorney, Agent, or Firm* — Polsinelli

(57) ABSTRACT

Systems, methods, and computer-readable media for generating and presenting workflow graphs can include the following operations. A workflow graph including vertices is provided. An event is received to reorganize the vertices of the workflow graph. Each of the vertices is classified with a significance level, the significance level is based on at least one of a business rule and a vertex position of a vertex of the vertices. Vertices of the vertices having a low significance level are grouped together. The vertices in the group having the low significance level are combined into a new vertex, and the new vertex is expandable and collapsible to view the vertices in the group having the low significance level.

20 Claims, 8 Drawing Sheets

REDUCING COMPLEXITY OF WORKFLOW GRAPHS THROUGH VERTEX GROUPING AND CONTRACTION

TECHNICAL FIELD

The subject matter of this disclosure relates in general to generating and presenting workflow graphs, and more particularly, to reducing complexity of workflow graphs through vertex grouping and contraction.

BACKGROUND

Reducing the complexity of workflow graphs is important in understanding the workflow efficiently. Specifically, some network interaction workflow graphs are too complex to be visualized and understood efficiently, because there are too many vertices and links involved in the same network interaction workflow graph. Moreover, by having all the vertices and links on the same network interaction workflow graph and sometimes intersecting each other, the logic behind a specific branch can be hard to follow because the other branches can interfere with the understanding of the specific branch.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
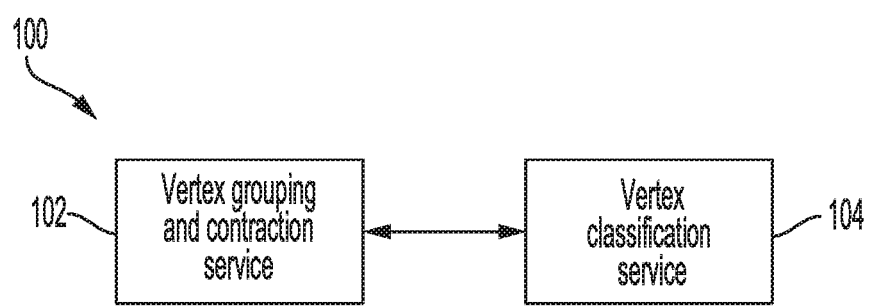
FIG. 1 illustrates an example system for reducing complexity of workflow graphs through vertex grouping and contraction in accordance with various embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A computer-implemented method to reduce complexity of workflow graphs through vertex grouping and contraction can include the following operations. A workflow graph including vertices is provided. An event is received to reorganize the vertices of the workflow graph. Each of the vertices is classified with a significance level, the significance level is based on at least one of a business rule and a vertex position of a vertex of the vertices. Vertices of the vertices having a low significance level are grouped together. The vertices in the group having the low significance level are combined into a new vertex, and the new vertex is expandable and collapsible to view the vertices in the group having the low significance level.

A system can include one or more processors; and at least one computer-readable storage medium having stored therein instructions which, when executed by the one or more processors, can cause the one or more processors to perform the following operations to reduce complexity of workflow graphs through vertex grouping and contraction. A workflow graph including vertices is provided. An event is received to reorganize the vertices of the workflow graph. Each of the vertices is classified with a significance level, the significance level is based on at least one of a business rule and a vertex position of a vertex of the vertices. Vertices of the vertices having a low significance level are grouped together. The vertices in the group having the low significance level are combined into a new vertex, and the new vertex is expandable and collapsible to view the vertices in the group having the low significance level.

A non-transitory computer-readable storage medium having stored therein instructions which, when executed by one or more processors, can cause the one or more processors to perform the following operations to reduce complexity of workflow graphs through vertex grouping and contraction. A workflow graph including vertices is provided. An event is received to reorganize the vertices of the workflow graph. Each of the vertices is classified with a significance level, the significance level is based on at least one of a business rule and a vertex position of a vertex of the vertices. Vertices of the vertices having a low significance level are grouped together. The vertices in the group having the low significance level are combined into a new vertex, and the new vertex is expandable and collapsible to view the vertices in the group having the low significance level.

Example Embodiments

The disclosed technology addresses the need in the art for reducing complexity of workflow graphs by utilizing vertex grouping and contraction. In particular, from a user experience perspective, the disclosed technology provides several improvements over the traditional workflow graph. First, this technology makes it easier for the user to understand the general logic that precedes a specific leaf node. Second, this technology makes it easier for the user to understand the detailed logic within a group of vertices when needed. Third, by grouping vertices into operator groups thus condensing the workflow graphs, the user can selectively expand the applicable operator groups that are of interest without having the complexity of the rest of the workflow graph interfere with understanding such a specific logical branch.

FIG. 1 illustrates an example system 100 for reducing complexity of workflow graphs through vertex grouping and contraction in accordance with various embodiments. System 100 includes a vertex grouping and contraction service 102 and a vertex classification service 104. The vertex grouping and contraction service 102 can group and contract vertices within a workflow. The vertex classification service 104 can classify a significance level of each vertex within a workflow. Although described as independent services, the vertex grouping and contraction service 102 and the vertex classification service 104 can be combined into a single service, and each can perform some of the operations performed by the other service. In some embodiments, system 100 can also be integrated into a Workflow Editor, such as the Cisco® Machine Reasoning Engine (MRE) Workflow Editor.

Figure 2:
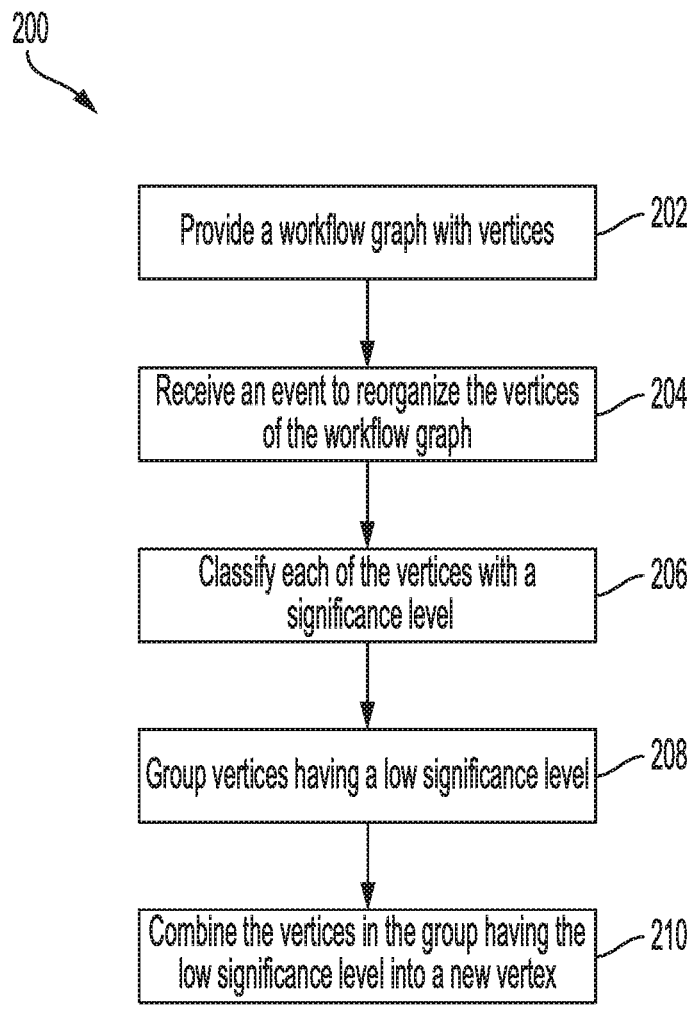
FIG. 2 illustrates an example method for reducing complexity of workflow graphs through vertex grouping and contraction in accordance with various embodiments.

FIG. 2 illustrates an example method 200 for reducing complexity of workflow graphs through vertex grouping and contraction in accordance with variance embodiments. The method shown in FIG. 2 is provided by way of example, as there are a variety of ways to carry out the method. Additionally, while the example method is illustrated with a particular order of steps, those of ordinary skill in the art will appreciate that FIG. 2 and the modules shown therein can be executed in any order and can include fewer or more modules than illustrated.

System 100 provides a workflow graph with vertices (202). A workflow graph is a graphical step-by-step representation of a series of actions, and it is composed of a set of vertices, which are connected by directed edges. For example, a network interaction workflow can include different types of vertices to represent concepts such as device commands, network data, data operators, constant values, inferred conclusions, etc. The order of the vertices is helpful for understanding the logic behind how certain conclusions have been reached.

System 100 receives an event to reorganize the vertices of the workflow graph (204). For example, the event can be a user opening the workflow graph. In another example, the event can be a request to reorganize the workflow graph. In some embodiments, the event can be the triggered through interaction with a user interface. For example, the event can be triggered through a user activating an icon in a user interface. In some embodiments, the event can be defined by the system 100 or the user.

A vertex classification service classifies each of the vertices with a significance level (206). For example, vertex classification service 104 can classify each of the vertices with a significance level. A significance level, as used herein, can include a measure or classification of an importance of a vertex in the overall workflow represented by a workflow graph. Significance levels can be defined in comparison with each other within the workflow. For example, a significance level can be classified as a high significance level with respect to other significance levels. Further significance levels can be defined with respect to other significance levels based on comparisons of importance of vertices correspond to the significance levels. For example, a significance level of a vertex can be defined as a high significance level with respect to significance levels of other vertices if the importance of the vertex in the workflow is greater than the importance of the other vertices in the workflow. The classification of a significance level can be based on a variety of factors, e.g. predefined factors. For example, the system or a user can predefine factors used in classifying significance levels of vertices.

In some embodiments, classification of significance level is based on vertex type of vertices in the workflow graph. In an example of a network interaction workflow, the vertex type of vertices that indicates a high significance level includes at least one of device commands, network data, and inferred conclusions. In this example, these types of vertices are considered as high significance because they can be used to create an outline of the entire network interaction workflow. On the other hand, other types of vertices are considered as low significance, because they are only relevant when the user is interested in a detailed perspective of how specific conclusions are derived from the network data.

In some embodiments, classification of significance level is based on vertex position of vertices in the workflow graph. In some embodiments, the vertex position of vertices that indicates a high significance level includes at least one of root vertex, leaf vertex, and any vertex with no sibling vertices. These types of vertices are considered as high significance because they are more important in the structure of the workflow graph. As an example, these types of vertices can be characterized as more important, e.g. when compared to other vertices that are classified as less important, because they can be essential in understanding, e.g. from a visual and/or conceptual perspective, the main logic flow of the workflow graph. Further in the example, these vertices can be characterized as more important if changes made on these vertices can impact the entire structure more greatly, e.g. when compared to vertices that are classified as less important. On the other hand, other types of vertices are considered as low significance. As an example, these types of vertices are less important, e.g. when compared to other vertices that are classified as more important, because changes made on these vertices can have less impact on the while structure than changing the high significant vertices.

In some embodiments, classification of significance level is based on a vertex's connectivity pattern with other vertices. The connectivity pattern includes the existence of absence of edges connecting the vertex to other vertices. In some embodiments, the connectivity pattern of vertices that indicates a high significance level includes more edges that connect the vertex to other vertices, comparing to connectivity pattern of vertices that indicates a low significance level.

Classification of significance level can also be based on significance levels of other vertices within the same workflow. Thus, method 200 can also include updating the significance level of each of the plurality of vertices based on an update of the workflow graph. For example, the significance level of a vertex representing network data can be updated from a low significance level to a high significance level, when the only descendant of this vertex has been deleted. In another example, the significance level of the vertex representing the network data can be updated from the low significance level to the high significance level when the vertex represents an inferred conclusion. In another example, the significance level of a leaf vertex will be updated from high significance level to low significance level, when another vertex is being added as a descendant of this vertex that represents a conclusion, and this vertex has other sibling vertices.

After the classification, a vertex grouping and contraction service groups vertices having a low significance level (208). For example, the vertex grouping and contraction service 102 can group vertices having a low significance level. The details regarding the grouping will be described with regard to FIG. 3.

A vertex grouping and contraction service combines the vertices in the group having the low significance level into a new vertex (210). For example, the vertex grouping and contraction service 102 can combine the vertices in the group having the low significance level into a new vertex. The details regarding this process will be described with regard to FIG. 4A, FIG. 4B, FIG. 5A, and FIG. 5B.

Figure 3:
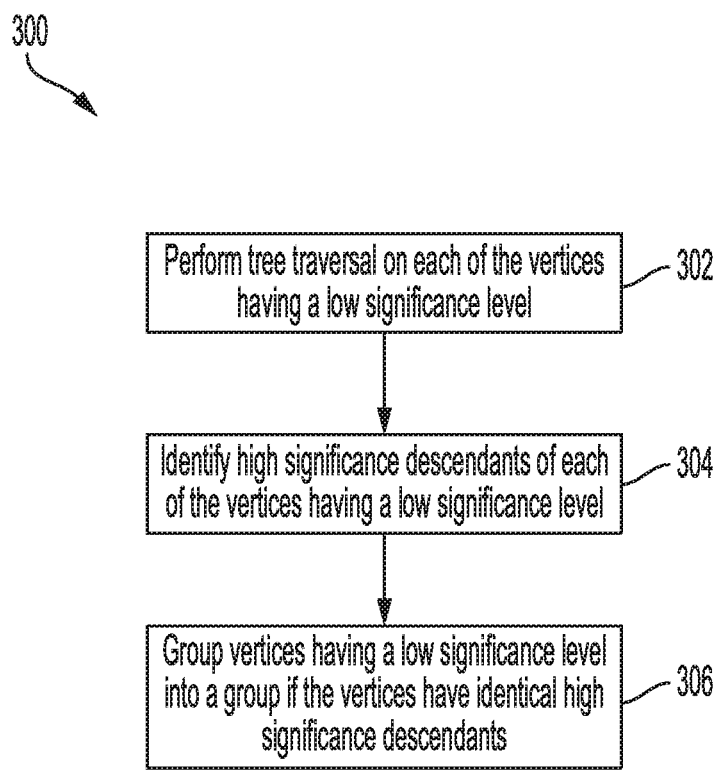
FIG. 3 illustrates an example method for grouping vertices having a low significance level in accordance with various embodiments.

FIG. 3 illustrates an example method 300 for grouping vertices having a low significance level in accordance with various embodiments. The method 300 shown in FIG. 3 is provided by way of example, as there are a variety of ways to carry out the method. Additionally, while the example method is illustrated with a particular order of steps, those of ordinary skill in the art will appreciate that FIG. 3 and the modules shown therein can be executed in any order and can include fewer or more modules than illustrated.

A vertex grouping and contraction service performs tree traversal on each of the vertices having a low significance level (302). For example, the vertex grouping and contraction service 102 can perform tree traversal on each of the vertices having a low significance level. In some embodiments, such tree traversal includes identifying all the descendants of each of the vertices having a low significance level.

Those of ordinary skill in the art will appreciate the tree traversal as a form of graph traversal, which includes visiting/checking each node in a tree data structure. For example, tree traversal could include depth-first search of a binary tree, breadth-first search/level order, or other types of tree traversal. Depth-first search of a binary tree could also include pre-order search, in-order search, reverse in-order search, and post-order search. By utilizing such tree traversal, information of each node can be gathered for better understanding the logic of the tree structure, either in whole or in part.

A vertex grouping and contraction service identifies high significance descendants of each of the vertices having a low significance level (304). For example, the vertex grouping and contraction service 102 can identify high significance descendants of each of the vertices having a low significance level. In some embodiments, the identification process is performed amongst all descendants of each of the vertices having a low significance level, and the vertices having a high significance level that have been found during the process are identified as the high significance descendants.

A vertex grouping and contraction service groups vertices having a low significance level into a group if the vertices have identical high significance descendants (306). For example, the vertex grouping and contraction service 102 can group vertices having a low significance level into a group if the vertices have identical high significance descendants. In some embodiments, having identical high significance descendants can be defined as each of the two or more vertices having the same set of high significance descendants. After such groups of vertices having a low significance level are generated, the vertex grouping and contraction service 102 contracts each group into a single vertex. Such single vertex can also be referred to as an operator group.

Figure 4A:
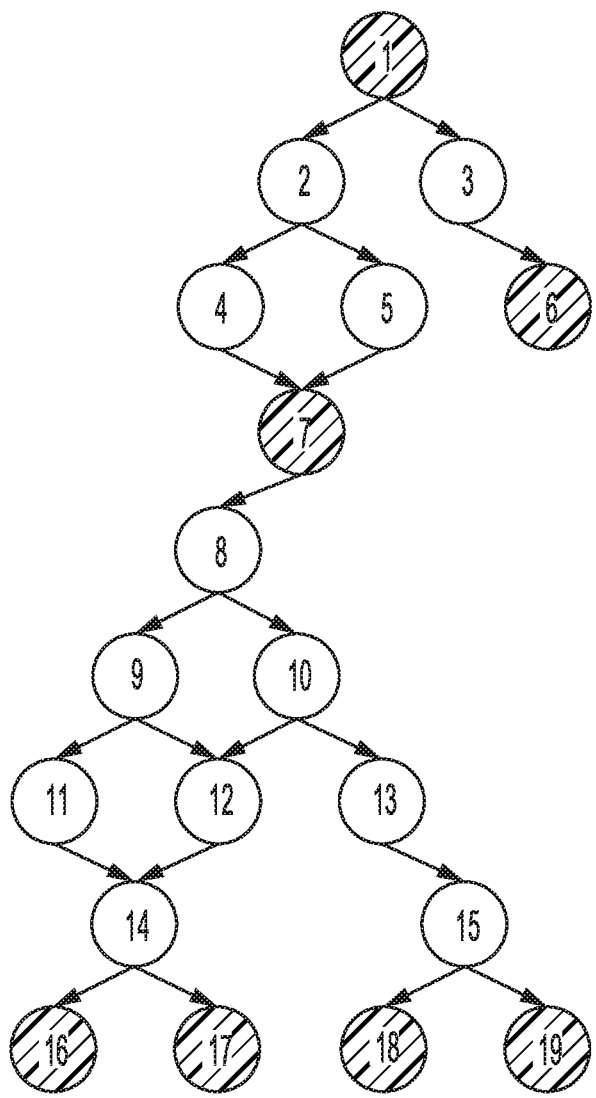
FIG. 4A illustrates an example graph without vertex grouping and contraction in accordance with various embodiments.
Figure 4B:
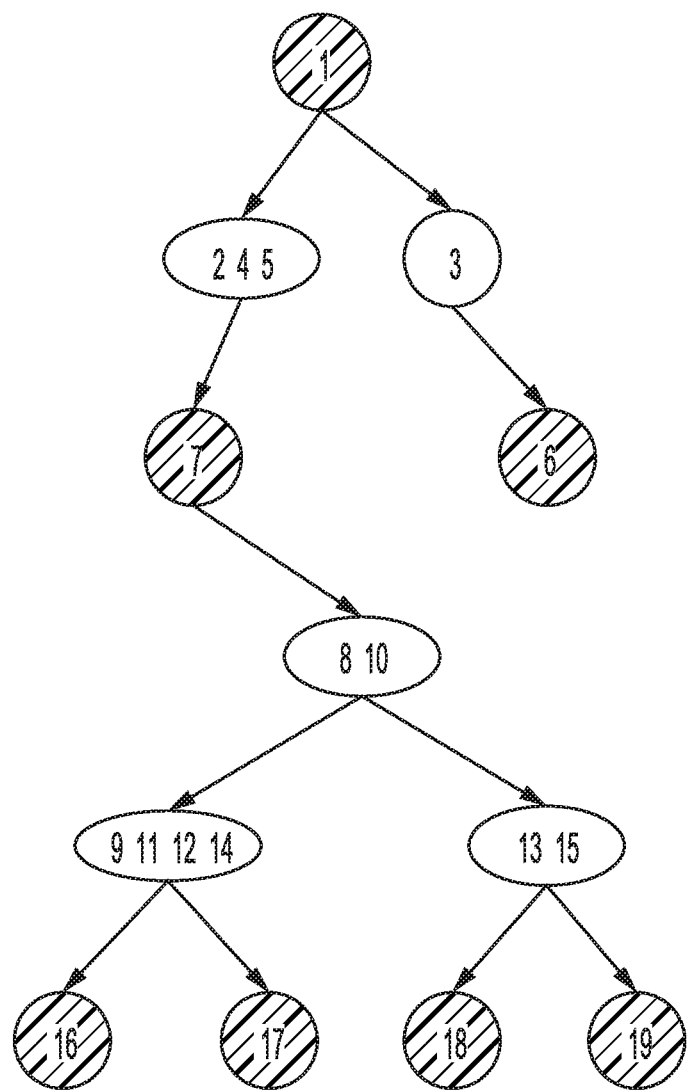
FIG. 4B illustrates an example graph after vertex grouping and contraction in accordance with various embodiments.

FIG. 4A illustrates an example graph without vertex grouping and contraction in accordance with various embodiments. FIG. 4B illustrates an example graph after vertex grouping and contraction in accordance with various embodiments.

FIG. 4A and FIG. 4B will be described as examples with regard to FIG. 1, FIG. 2, and FIG. 3. In these examples, a generic workflow graph has been provided here in FIG. 4A, and a user has given the instruction to reorganize the vertices of this generic workflow graph. These generic workflow graph includes vertices marked with numbers to identify them, and links to identify the logic flow and the relationships between the vertices. Although classification of significance level is based on a variety of preset factors, this example uses only vertex positions for ease of description. As described above in FIG. 2, the vertex positions of vertices that indicate a high significance level includes at least one of a root vertex, a leaf vertex, and any vertex lacking sibling vertices. Those of ordinary skill in the art will appreciate the sibling vertices can be vertices with the same parent vertex, e.g. stem from the same vertex in a hierarchical structure. Because vertex 1 is a root vertex, vertices 6, 16, 17, 18, and 19 are leaf vertices, and vertex 7 has no sibling vertices, vertex classification service 104 classifies these highlighted vertices as having high significance levels, and the rest of the vertices in the workflow as having low significance levels.

The vertex grouping and contraction service 102 then groups vertices having a low significance level. Specifically, the vertex grouping and contraction service 102 performs tree traversal on each of the vertices having a low significance level, to identify all the predecessors and descendants of each of the vertices having a low significance level, and their respective significance levels. In an example, pre-order tree traversal can be performed on the branch, which expands from vertex 1 to vertex 7, of the tree structure shown in FIG. 4A, the vertex grouping and contraction service will visit/check each of the vertices of the branch in the following order: 1, 2, 4, 5, 7, 3, 6. During this example or pre-order tree traversal, information such as the predecessors and descendants of each of the vertices are gathered for future use.

Next, the vertex grouping and contraction service 102 identifies high significance descendants of each of the vertices having a low significance level. For example, vertices 9, 11, 12, and 14 all have vertices 16 and 17 as their high significance descendants.

The vertex grouping and contraction service 102 groups vertices having a low significance level into a group if the vertices have identical high significance descendants. For example, vertices 9, 11, 12, and 14 are grouped together because they all have vertices 16 and 17 as their identical high significance descendants. In another example, vertices 8 and 9 are not grouped together because vertices 8 and 9 do not have identical high significance descendants. Even though they both have vertices 16 and 17 as common high significance descendants, vertex 8 has two more high significance descendants (vertices 18 and 19) than vertex 9, thus they do not have identical high significance descendants.

The vertex grouping and contraction service 102 then combines the vertices in the group having the low significance level into a new vertex (operator group) as shown in FIG. 4B. For example, vertices 9, 11, 12, and 14 that have identical high significance descendants are grouped and contracted into a new operator group. From a user experience perspective, the generic workflow graph in FIG. 4A has been reorganized into a more simplified version with fewer vertices in FIG. 4B.

Figure 5A:
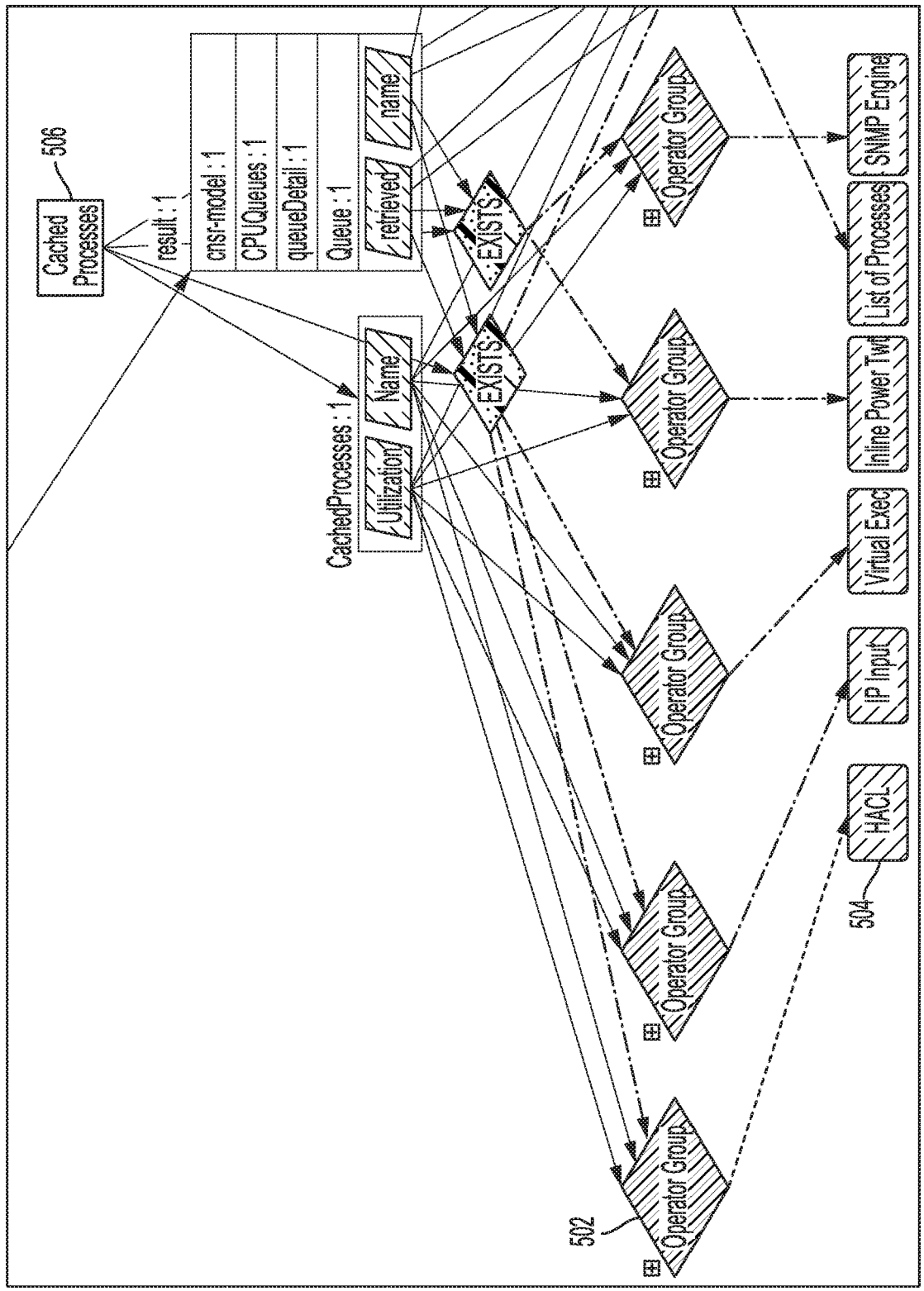
FIG. 5A illustrates an example user interface of application of the example system and methods as shown in FIG. 1, FIG. 2, and FIG. 3.
Figure 5B:
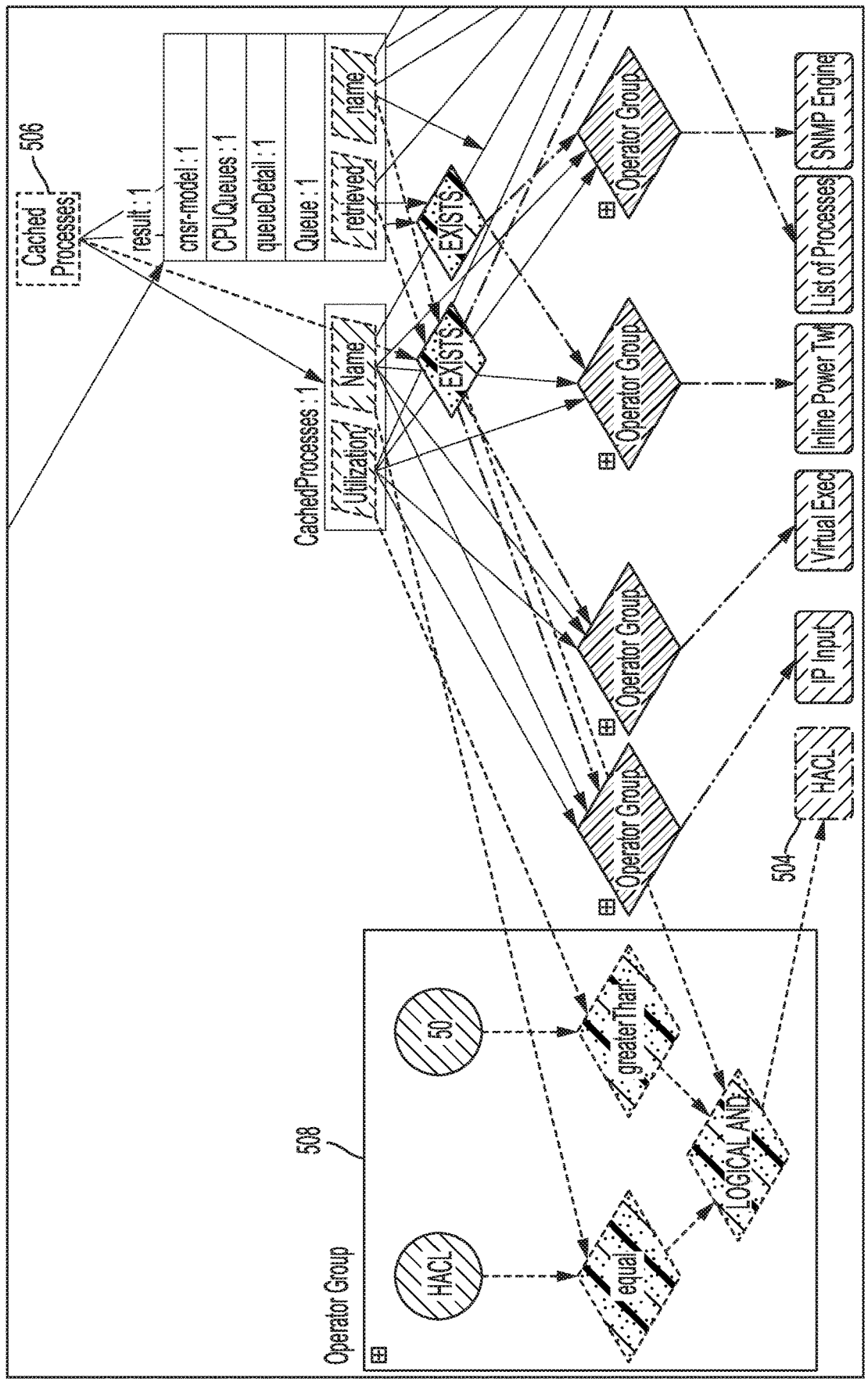
FIG. 5B illustrates another example user interface of application of the example system and methods as shown in FIG. 1, FIG. 2, and FIG. 3.

FIG. 5A illustrates an example user interface of application of the example system and methods as shown in FIG. 1, FIG. 2, and FIG. 3. FIG. 5B illustrates another example user interface of application of the example system and methods as shown in FIG. 1, FIG. 2, and FIG. 3.

FIG. 5A and FIG. 5B will be described as examples with regard to FIG. 1, FIG. 2, and FIG. 3. In these examples, a machine reasoning workflow has been reorganized by the methods described in FIG. 2 and FIG. 3. This machine reasoning workflow includes vertices and operator groups, such as operator group 502 of FIG. 5A. The groups of vertices 508 of FIG. 5B have been grouped and contracted into the operator group 502 by using the methods described in FIG. 2 and FIG. 3. When a user wants to understand the detailed logic regarding the operator group 502, the user can select the operator group 502 to trigger additional functions. A description of examples of the additional functions that can be triggered now follows. In some embodiments after the selection of the operator group 502, the outgoing link from the operator group 502 to the leaf node 504 is highlighted in a different color as shown in FIG. 5A. In some embodiments after the selection of the operator group 502, the operator group 502 will expand into the groups of vertices 508 of FIG. 5B. In some embodiments after the selection of the operator group 502, the operator group 502 needs to be selected again so the operator group 502 can expand into the groups of vertices 508 of FIG. 5B. In some embodiments after the selection of the operator group 502, the user can select the leaf node 504, so the links from the selected leaf node 504 to the root node 506 through the groups of vertices 508 are highlighted in a different color. In some embodiments, after the selection and expansion of the operator group 502, the user can select the groups of vertices 508 to collapse it back to the operator group 502. In some embodiments, during the selection and expansion of the operator group 502, the other unrelated operator groups that were not being selected remain the same.

From a user experience perspective, this technology as described with regard to the above figures provides several improvements over the traditional workflow graph. First, this technology makes it easier for the user to understand the general logic that precedes the leaf node, or related to the operator group 502. Second, this technology makes it easier for the user to understand the detailed logic within the group of vertices 508 when needed. Third, by condensing the graph using grouped vertices such as the group of vertices 508, the user can selectively expand the applicable operator groups that are of interest without having the complexity of the rest of the workflow graph interfere with understanding such a specific logical branch.

Figure 6:
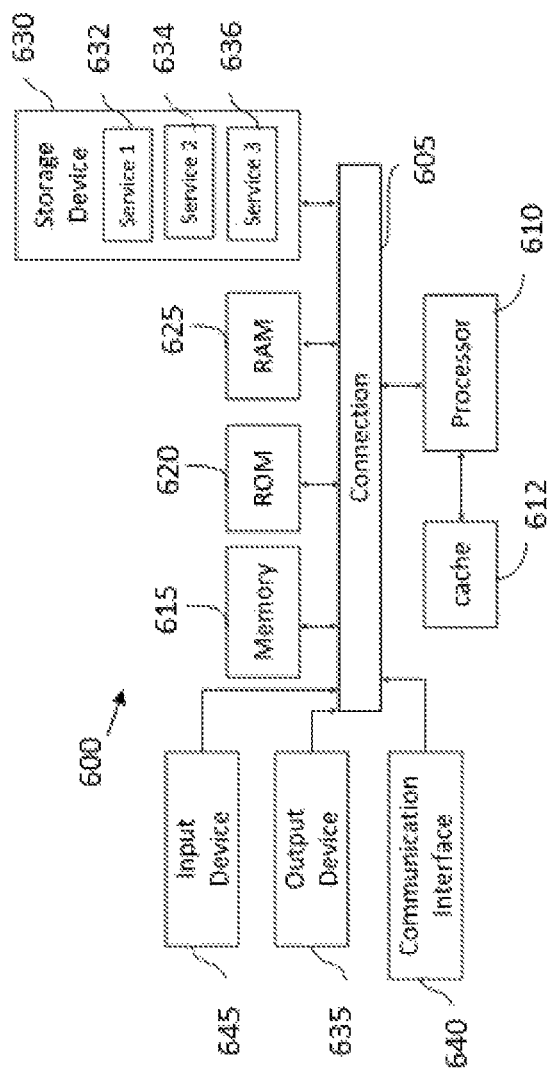
FIG. 6 illustrates an example of computing system in accordance with some aspects of the present technology.

FIG. 6 illustrates an example of computing system 600, which can be for example any computing device making up system 100, the vertex grouping and contraction service 102, the vertex classification service 104, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
providing, via a computing device operating a vertex grouping and contraction service and a vertex classification service, a workflow graph including a plurality of vertices;
receiving an event to reorganize, via the computing device operating the vertex grouping and contraction service and the vertex classification service, the plurality of vertices of the workflow graph;
classifying, via the computing device operating the vertex grouping and contraction service and the vertex classification service, each of the plurality of vertices with a significance level, the significance level defined based on a vertex position of a vertex of the plurality of vertices and a connectivity pattern of a vertex with other vertices;
grouping, via the computing device operating the vertex grouping and contraction service and the vertex classification service, vertices of the plurality of vertices having a low significance level; and
combining, via the computing device operating the vertex grouping and contraction service and the vertex classification service, the vertices in the group having the low significance level into a new vertex, the new vertex being expandable and collapsible to display the vertices in the group having the low significance level.

2. The method of claim 1, wherein the event includes at least one of opening of the workflow graph by a user and a request to reorganize the workflow graph by the user.

3. The method of claim 1, wherein the classifying of each of the plurality of vertices is further based on a corresponding vertex type of each of the plurality of vertices, the vertex type including at least one of one or more device commands associated with each of the plurality of vertices, network data associated with each of the plurality of vertices, one or more data operators associated with each of the plurality of vertices, one or more constant values associated with each of the plurality of vertices, and one or more inferred conclusions associated with each of the plurality of vertices.

4. The method of claim 3, wherein a vertex type of vertices having high significance level comprises at least one of device commands, network data, and inferred conclusions.

5. The method of claim 1, wherein the classifying of each of the plurality of vertices is further based on a corresponding vertex position of each of the plurality of vertices and the vertex position of one or more vertices classified with a high significance level includes at least one of a root vertex, a leaf vertex, and a vertex lacking sibling vertices.

6. The method of claim 1, wherein the classifying of each of the plurality of vertices is further based on the connectivity pattern of a vertex with other vertices, wherein the connectivity pattern of the vertex comprises a pattern and a number of edges connecting the vertex with other vertices.

7. The method of claim 1, wherein the grouping of the vertices of the plurality of vertices having the low significance level further comprises:
performing tree traversal on each of the vertices having the low significance level: and
identifying, among descendants of each of the vertices having the low significance level, one or more vertices having a high significance level as high significance descendants of each of the vertices having the low significance level.

8. The method of claim 7, wherein the grouping of the vertices of the plurality of vertices having the low significance level further comprises grouping the vertices having the low significance level into the group if the vertices have identical high significance descendants.

9. The method of claim 1, further comprising updating the significance level of each of the plurality of vertices based on an update of the workflow graph.

10. A system comprising:
one or more processors; and
at least one computer-readable storage medium having stored therein instructions which, when executed by the one or more processors, cause the one or more processors to operate a vertex grouping and contraction service and a vertex classification service that performs operations comprising:
providing a workflow graph including a plurality of vertices;
receiving an event to reorganize the plurality of vertices of the workflow graph;
classifying each of the plurality of vertices with a significance level, the significance level defined based on a vertex position of a vertex of the plurality of vertices and a connectivity pattern of a vertex with other vertices;
grouping vertices of the plurality of vertices having a low significance level; and
combining the vertices in the group having the low significance level into a new vertex, the new vertex being expandable and collapsible to display the vertices in the group having the low significance level.

11. The system of claim 10, wherein the event includes at least one of opening of the workflow graph by a user and a request to reorganize the workflow graph by the user.

12. The system of claim 10, wherein the classifying of each of the plurality of vertices is further based on a corresponding vertex type of each of the plurality of vertices, the vertex type including at least one of one or more device commands associated with each of the plurality of vertices, network data associated with each of the plurality of vertices, one or more data operators associated with each of the plurality of vertices, one or more constant values associated with each of the plurality of vertices, and one or more inferred conclusions associated with each of the plurality of vertices.

13. The method of claim 10, wherein each of the vertices in a group having the low significance level descend from a vertex of a high significance level.

14. The system of claim 10, wherein the classifying of each of the plurality of vertices is further based on a corresponding vertex position of each of the plurality of vertices and the vertex position of one or more vertices classified with a high significance level includes at least one of a root vertex, a leaf vertex, and a vertex lacking sibling vertices.

15. The system of claim 10, wherein the instructions which, when executed by the one or more processors, further cause the one or more processors to perform operations comprising:
performing tree traversal on each of the vertices having the low significance level; and
identifying, among descendants of each of the vertices having the low significance level, one or more vertices having a high significance level as high significance descendants of each of the vertices having the low significance level.

16. The system of claim 15, wherein the grouping of the vertices of the plurality of vertices having the low significance level further comprises grouping the vertices having the low significance level into the group if the vertices have identical high significance descendants.

17. A non-transitory computer-readable storage medium having stored therein instructions which, when executed by one or more processors, cause the one or more processors to operate a vertex grouping and contraction service and a vertex classification service that performs operations comprising:
providing a workflow graph including a plurality of vertices;
receiving an event to reorganize the plurality of vertices of the workflow graph;
classifying each of the plurality of vertices with a significance level, the significance level defined based on a vertex position of a vertex of the plurality of vertices and a connectivity pattern of a vertex with other vertices;
grouping vertices of the plurality of vertices having a low significance level; and
combining the vertices in the group having the low significance level into a new vertex, the new vertex being expandable and collapsible to display the vertices in the group having the low significance level.

18. The non-transitory computer-readable storage medium of claim 17, wherein the operations further comprise:
performing tree traversal on each of the vertices having the low significance level: and
identifying, among descendants of each of the vertices having the low significance level, one or more vertices having a high significance level as high significance descendants of each of the vertices having the low significance level.

19. The non-transitory computer-readable storage medium of claim 17, wherein the grouping of the vertices of the plurality of vertices having the low significance level further comprises grouping the vertices having the low significance level into the group if the vertices have identical high significance descendants.

20. The non-transitory computer-readable storage medium of claim 17, wherein the operations further comprise updating the significance level of each of the plurality of vertices based on an update of the workflow graph.

\* \* \* \* \*